United States Patent
Schatt et al.

(10) Patent No.: US 9,558,388 B2
(45) Date of Patent: Jan. 31, 2017

(54) CODING DEVICE AND POSITION-DETERMINING DEVICE AND POSITION-DETERMINING METHOD

(71) Applicant: CEDES AG, Landquart (CH)

(72) Inventors: Michael Schatt, Pfaeffikon (CH); Marco Graf, Grabs (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 15/097,572

(22) Filed: Apr. 13, 2016

(65) Prior Publication Data
US 2016/0275328 A1    Sep. 22, 2016

Related U.S. Application Data

(63) Continuation of application No. PCT/EP2014/002762, filed on Oct. 14, 2014.

(30) Foreign Application Priority Data

Oct. 14, 2013  (EP) ..................... 13004910

(51) Int. Cl.
*G06K 7/10* (2006.01)
*G06K 7/14* (2006.01)
*G06K 19/06* (2006.01)

(52) U.S. Cl.
CPC ........... *G06K 7/1443* (2013.01); *G06K 7/1413* (2013.01); *G06K 7/1417* (2013.01); *G06K 19/06037* (2013.01)

(58) Field of Classification Search
CPC .............. G06K 7/10; G06K 9/36; G06K 9/18; G06K 9/80; G06K 5/00; G06K 7/14; G06K 15/12; G06K 19/00; G03B 7/08; G06F 17/00

USPC .............. 235/462.11, 462.1, 462.09, 462.01, 235/462.24, 462.41, 375, 487
See application file for complete search history.

(56) References Cited

U.S. PATENT DOCUMENTS

| | | | |
|---|---|---|---|
| 4,433,756 A | 2/1984 | Caputo et al. | |
| 5,821,477 A | * 10/1998 | Gerstenkorn | ......... B66B 1/3492 187/316 |
| 2013/0001023 A1 | 1/2013 | Leutenegger et al. | |

(Continued)

FOREIGN PATENT DOCUMENTS

| EP | 0 722 903 A1 | 7/1996 |
|---|---|---|
| EP | 2 540 651 A1 | 1/2013 |

OTHER PUBLICATIONS

International Search Report and Written Opinion (Application No. PCT/EP2014/002762) dated Jan. 20, 2015.

(Continued)

*Primary Examiner* — Edwyn Labaze
(74) *Attorney, Agent, or Firm* — Burr & Brown, PLLC (57) ABSTRACT

In order to increase safety, a computer-implemented method is proposed for determining the position of a lift cabin in a lift shaft with the aid of a coding device, wherein a section of the code band and/or of the bearing device is recorded with an optical detection device as a pixel image consisting of pixels and the instant of the recording being measured and assigned to the pixel image, wherein the position is determinable analytically from position markers of the code band by way of an algorithm and wherein at least one checking method which uses, inter alia, a calculated extrapolated position is carried out.

21 Claims, 7 Drawing Sheets

(56) References Cited

U.S. PATENT DOCUMENTS

2013/0015238 A1* 1/2013 Studer .................. B66B 1/3492
235/375

OTHER PUBLICATIONS

International Preliminary Report on Patentability (PCT/EP2014/002762) mailed Apr. 28, 2016.

* cited by examiner

Fig. 1

Pixel recording
(100 x 24 x 12 bit)

Fig. 2

Pair of pixel strips
(2 x 2 x 24 x 12 bit)

Fig. 3

Extended image pattern
(with clip bars)
(8 x 7 x 1 bit)

Fig. 4

Image pattern
(8 x 5 x 1 bit)

Fig. 5

Position pattern
(8 x 3 x 1 bit)

CODING DEVICE AND POSITION-DETERMINING DEVICE AND POSITION-DETERMINING METHOD

CROSS REFERENCE TO RELATED APPLICATION

This application is a continuation of International Application No. PCT/EP2014/002762 filed Oct. 14, 2014, which designated the United States, and claims the benefit under 35 USC §119(a)-(d) of European Application No. 13004910.9 filed Oct. 14, 2013, the entireties of which are incorporated herein by reference.

FIELD OF THE INVENTION

The present invention relates to a coding device for marking positions in a lift shaft and for determining the position of lift cabins in the lift shaft, to a computer-implemented method for determining the position of a lift cabin in a lift shaft with the aid of a coding device, and to a position-determining device.

BACKGROUND OF THE INVENTION

The prior art, for example EP 0 722 903 B1, has disclosed a method in which a lift cabin is displaced in the lift shaft along a code band, wherein the lift cabin comprises a detector and, when the detector comes across an image pattern applied to the code band, it compares the latter with a reference pattern and derives information for the controller from the identified pattern.

SUMMARY OF THE INVENTION

An object of the present invention is to be able to provide a code band, a position-determining method and a position-determining device which enable an increased level of safety in operating the lift.

The present invention firstly makes available a code band in the case of which discrete positions are admittedly marked, but can, however, be provided in a density such that the lift cabin can read out its position practically permanently. The control unit for controlling the lift travel, that is to say its closed-loop and/or open-loop control, can thus be provided permanently with the information relating to the current position of the travel cabin, and there are practically no distances along which the travel cabin is driven "blind", that is to say without concrete position information, and cannot react until it meets a marking which is intended, for example, to cause the cabin to brake. This measure enables a high degree of safety in operating the lift. In addition, the present invention offers reliable and safe operation of the lift cabin, because the type of coding device and of computer-implemented method for determining the position enables inspection options, redundancies and plausibility checks by means of which high safety standards can be achieved. In particular, it is also possible to read out positions even when the code band is, for example, soiled and it is therefore no longer possible to read out all the information held there.

A further advantage of the present invention consists in that precisely in connection with the use of a coding device according to an exemplary embodiment of the present invention having bearing devices, there is, in addition, the possibility of being able to take account of the subsiding of a newly constructed building when evaluating and determining the position of the lift cabin, even of being able to correct the determination of position. Newly erected buildings mostly have the property that they "subside" with time, that is to say instances of compression can occur in the building in the course of time because of the high weight loads. This effect can occur precisely with high buildings, which mostly have a lift. It is a particularly problematic feature of this effect in the construction of buildings that not all parts of the building respond uniformly thereto. In particular, as a rule, the lift structure in which the travel cabin is mounted to be driven is not affected thereby, or is at least only partially affected thereby. In such a case, the partial compression of the building wall means that the travel cabins are also displaced with respect to the frame of the lift shaft. Such a correction, which is likewise enabled by the present invention, can compensate this phenomenon of subsidence of a building. In particular, it is possible thereby to increase the safety and reliability in operation of the lift.

The inventive coding device serves for marking positions in a lift shaft, and for determining the position of lift cabins in the lift shaft. It comprises a code band which is, for example, suspended and fastened in the lift shaft on the ceiling of the building. The code band is mounted to move in the lift shaft via a bearing device. When, for example, the building subsides and is partially compressed inwardly, the code band can appropriately move downward together with the ceiling of the building and yet continue to hang freely, because it is mounted to move inside the bearing devices and not held fast. Consequently, the freely hanging code band must also not bend or be compressed during subsidence of the coding. The markings on the code band are provided along its length, for example equidistantly. The markings can be designed as a barcode, but particularly preferably as 2D code (two-dimensional code). Firstly, such a 2D code visually delivers a particularly advantageous, simplified detection, but also a high density of coding options.

In principle, a barcode can be arranged in a row, but a 2D code (two-dimensional code) can likewise be provided accordingly. A 2D code is normally designed as a matrix, it being possible for the individual matrix elements to form bright or dark, that is to say the values 1 or 0. One or more rows together as a position pattern can mark a discrete position as such. It is particularly advantageous for this type of markings that they can not only be easily detected and read out, but also can be decoded by means of an algorithm and be processed mathematically. The advantage is likewise achieved thereby that it is possible to avoid complicated comparisons of images with reference patterns which, on the one hand, can be more prone to error but, on the other hand, also require computers of high graphic computing power and, moreover, necessitate memories with high capacity for storing the reference patterns. In accordance with the present invention, the mathematical algorithm can be evaluated with the aid of a computer, and, if appropriate, even by means of a simple microcontroller or microprocessor. This advantage in time also enables the markings to be evaluated very quickly so that even in the case of high marking density, the travel cabin can be permanently informed of its position in the lift shaft during its trip.

The computer-implemented method according to the present invention comprises a first partial method with image processing and a position pattern analysis from an analysis method. An extrapolation method is added as a second partial method. The method step of image processing comprises the following sections:

A section of a code band and/or of the bearing device is recorded with an optical detection device as a pixel image consisting of pixels and the instant of the recording is measured and assigned to the pixel image, wherein the recorded section is selected to be so large that it comprises at least one more row than the position marker.

The pixel image is processed, in particular, assigned to a detection grid, wherein pixels of the pixel image preferably are combined with the aid of their color and/or position in order to be able to read out the barcode and/or 2D code of the marking.

The position pattern analysis from the analysis method in turn comprises the following partial sections:

The position marker is identified on the basis of the part of the marking for characterizing the position marker.

A position code is identified in the detection grid, in particular, as a barcode and/or 2D code, on the basis of the position marker.

The position code is converted to a binary code.

The binary code is decoded by means of an algorithm and converted into a position indication and/or into the information as to whether a bearing device has been detected.

The determined position indication is stored together with the assignable instant of the recording and/or together with indications about the movement of the lift cabin, such as e.g. velocity and/or acceleration, wherein the first partial method is repeatable at certain, preferably equal, time intervals of a travel of the lift cabin in order to be able to continuously obtain or generate position information during the travel.

The extrapolation method (second partial method) in turn comprises the following sections:

A check is carried out as to whether at least two stored position indications and the instant of recording thereof are stored.

An extrapolated position of the lift cabin is calculated (E) from the at least two position indications, the instants of the recording thereof and the indications about the movement of the lift cabin.

Subsequently, a checking method is carried out in the computer-implemented method according to the present invention. Optionally, it is also possible to carry out the plurality of checking methods in parallel or in series. The checking method, in turn, can provide an analysis method which comprises a checksum test and a full pattern test. The checksum test of the position marker, by means of which the position marker is checked in respect of plausibility, is carried out by virtue of a checksum being formed by way of the binary code and/or the grayscale values of the position marker and being compared to a predetermined value. In the full pattern test, a barcode and/or 2D code is calculated from the decoded position indication on the basis of the inverse of the algorithm, the code corresponding to the at least one row which was also recorded outside of the position marker, and this calculated barcode and/or 2D code is compared in respect of correspondence with the at least one recorded row.

In an embodiment of the present invention, a further checking method can consist of a comparison method, which provides the following steps:

A barcode and/or 2D code and/or a position marker is calculated from the extrapolated position indication on the basis of the inverse of the algorithm and compared with the position marker determined from the first partial method.

Optionally, the extrapolated position indication is output as position indication if the extrapolated position marker and the recorded position marker differ by at most a predetermined number of bars of the barcode and/or matrix elements of the 2D code.

In a particularly preferred embodiment of the present invention, the comparison method is complemented by an acceleration correction, in which a sequence of at least two position markers spaced apart from the extrapolated position marker is calculated and a comparison is carried out between this calculated position marker and the detected position marker, wherein, in particular, the position corresponding to the position for which the comparison yields complete correspondence or correspondence within a predetermined criterion is output as position specification.

Optionally, it is also possible to carry out a correlation method, in which at least one column of matrix elements of the markings is separated from at least two pixel images recorded with a time offset from one another in each case and the columns are compared in relation to their offset and in relation to an at least partial correspondence. In contrast to the other partial methods, columns are explicitly evaluated or compared in respect of correspondence in this case. What can be taken into account as a result thereof is, first of all, that rows are possibly dirtied in a certain part and therefore hardly readable. Secondly, parts over a certain section along the length of the code band are taken into account as a result thereof. Therefore, by "switching" from a row evaluation to a column evaluation, it is possible to take into account other sources of errors which possibly lead to no correct position being able to be found previously in the evaluation.

BRIEF DESCRIPTION OF THE INVENTION

Exemplary embodiments of the present invention are illustrated in the drawings and explained in more detail below with an indication of further details and advantages.

DETAILED DESCRIPTION OF THE INVENTION

Figure 1:
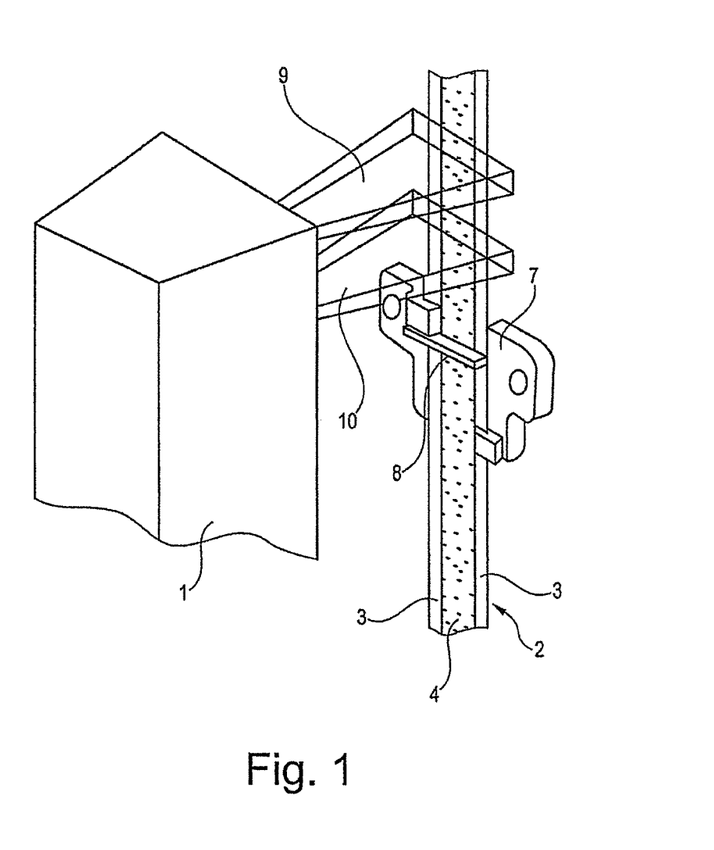
FIG. 1 shows the reading out of the coding device in accordance with the present invention by an optical detector.

FIG. 1 shows a detection device 1 which reads out a code band 2 in a lift shaft. Provided for this purpose on the lateral edges of the code band are position strips 3 which laterally delimit the 2D code 4. The coding device comprises the code band 2 and a clip 7. The code band 2 is mounted to move with such clips 7 as bearing device such that it can be displaced in a longitudinal direction when, for example, the building subsides with time. The clip 7 comprises a bridge 8 which overlaps the code 4 and/or the position strips 3. The detection device 1 basically comprises two cameras whose detection beams 9, 10 for recording a detection image are likewise illustrated in FIG. 1.

Figure 2:
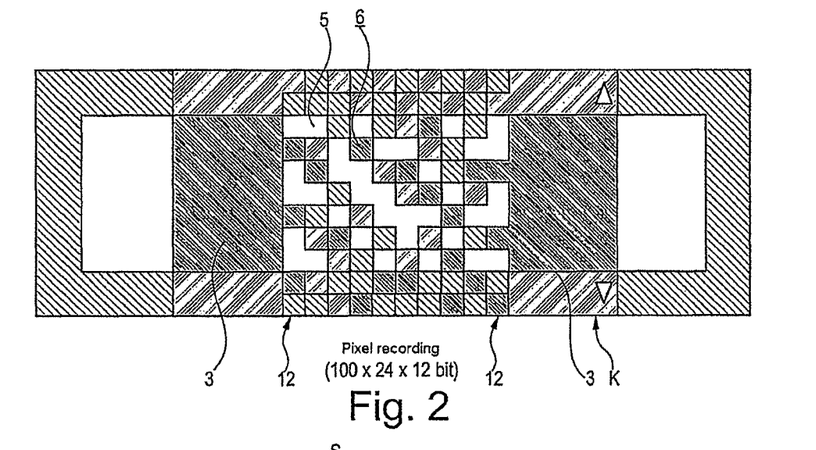
FIG. 2 shows a schematic illustration of a camera recording.

FIG. 2 shows the recorded image section 1 of the camera, which was recorded by the code band 2. The recording 1 overlaps the lateral edge of the code band 2. Position strips 3 are provided at the outer edges of the code band in a longitudinal direction of the code band 3. The strips are completely black in design and are therefore easily detected by the detection device and the evaluation method. These position strips 3 likewise provide screening, such that the evaluation method is able to detect the region in which the 2D code 4 is to be found. The 2D code is composed of a matrix 4 which has individual matrix elements 5, 6. The matrix element 5 is a bright one, while the matrix element 6 is a dark one. However, in general, the matrix elements 5, 6 do not correspond in each case to a single pixel of the camera recording. Consequently, it is necessary when processing images to assign recorded pixels to one another in accordance with their position and their brightness and combine them to form a matrix element. In the combined image, in turn, a pixel then represents a matrix element. Specified in FIGS. 3 to 6 are sections processed by image processing B and in the case of which camera pixels have been processed to form matrix elements.

Figure 7:
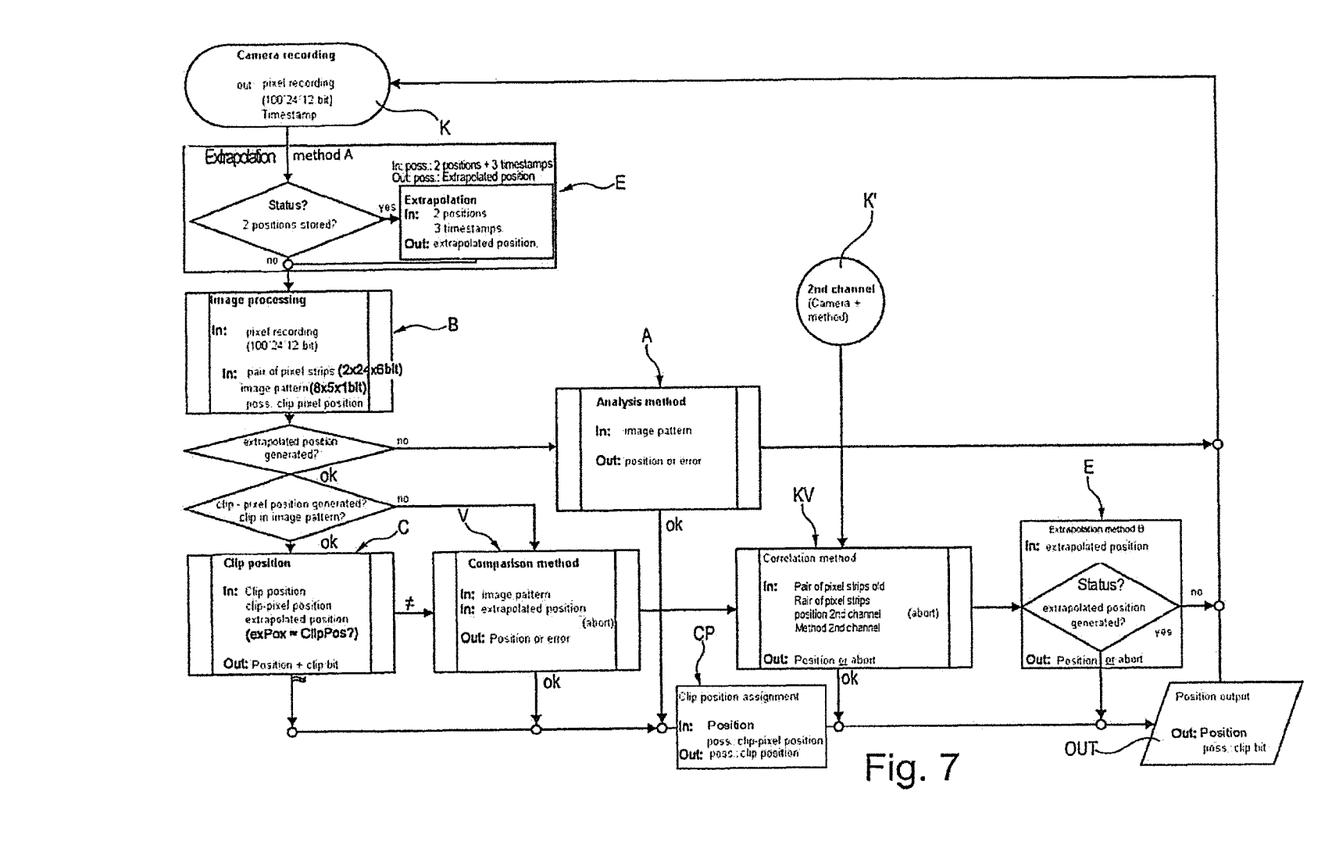
FIG. 7 shows an overall scheme of the computer-implemented method in accordance with the present invention.

An overall illustration of a computer-implemented method for determining the position is illustrated in FIG. 7.

Camera Recording K

The detection device 1 enables optical detection of the markings 3, 4 provided on the code band 2. The camera (optionally including a plurality of cameras) generally operates in the infrared region (IR light, wavelength approximately greater than 780 nanometers to 1 millimeter), so that, in particular, it is also possible to avoid interfering influences. If the cabin is traveling in the lift shaft in which the code band 2 is also suspended, the cabin will move along the code band, the camera being aligned such that it can correspondingly detect the code band. During the trip, the camera repeatedly takes recordings K of sections of the code band (in particular, in equal time intervals), compare FIG. 2. Such a pixel recording can typically comprise 100×24 pixels and be recorded as a grayscale image (for example, 12-bit image). At the same time, in the present case a clock or a timer is provided which assigns a timestamp depending on the camera recording, that is to say a time information item, when the recording is finished. This timestamp later enables evaluation of the images when further information is known, that is to say, for example, individual positions at specific instants, speed of the lift cabin or acceleration of the lift cabin.

Extrapolation Method E

The aim of the overall method from FIG. 7 is to determine the position of the lift cabin, specifically at different instants, making it possible, as already described, for the individual positions also to be given by timestamps. In a further method step, a check is made after the camera recording K as to whether there have already been determined in a memory two positions in relation to which two timestamps are also present. If this is the case, the position can be determined at a further, third instant (extrapolation). If the cabin has not carried out any uniform movement, the extrapolation can be performed, if appropriate, by taking account of the speed, known from the open-loop or closed-loop control of the cabin, of the lift cabin, or the acceleration of the lift cabin. Given uniform movement of the lift cabin, the speed thereof can be determined from two positions and their timestamps, that is to say the time information item, once these positions have been reached. If there is no change in this speed, the position can correspondingly be obtained therefrom at a further, third instant. If the lift cabin accelerates in this time, or if the lift cabin is braked in this time, this must be appropriately taken into account. These data, relating to the acceleration and, if appropriate, also to the speed, can be retrieved and read out in embodiments of the present invention by the control device of the travel cabin (open-loop or closed-loop control). If fewer than two positions are stored after carrying out the camera recording, the next method step is adopted without extrapolation taking place.

The precondition for carrying out the extrapolation method E is that at least two positions and three timestamps are stored. The two positions serve for being able to determine a path difference between the two positions. If two further timestamps are available, each of which is respectively assigned to one of the two positions, it is also possible to determine the time difference required to reach the other position proceeding from one of the two positions. The third timestamp is required in order, finally, to be able to determine the further position to be extrapolated. Thus, before actually carrying out the extrapolation method, a check needs to be made as to whether this precondition that a total of two positions and three timestamps are stored is satisfied.

Figure 8:
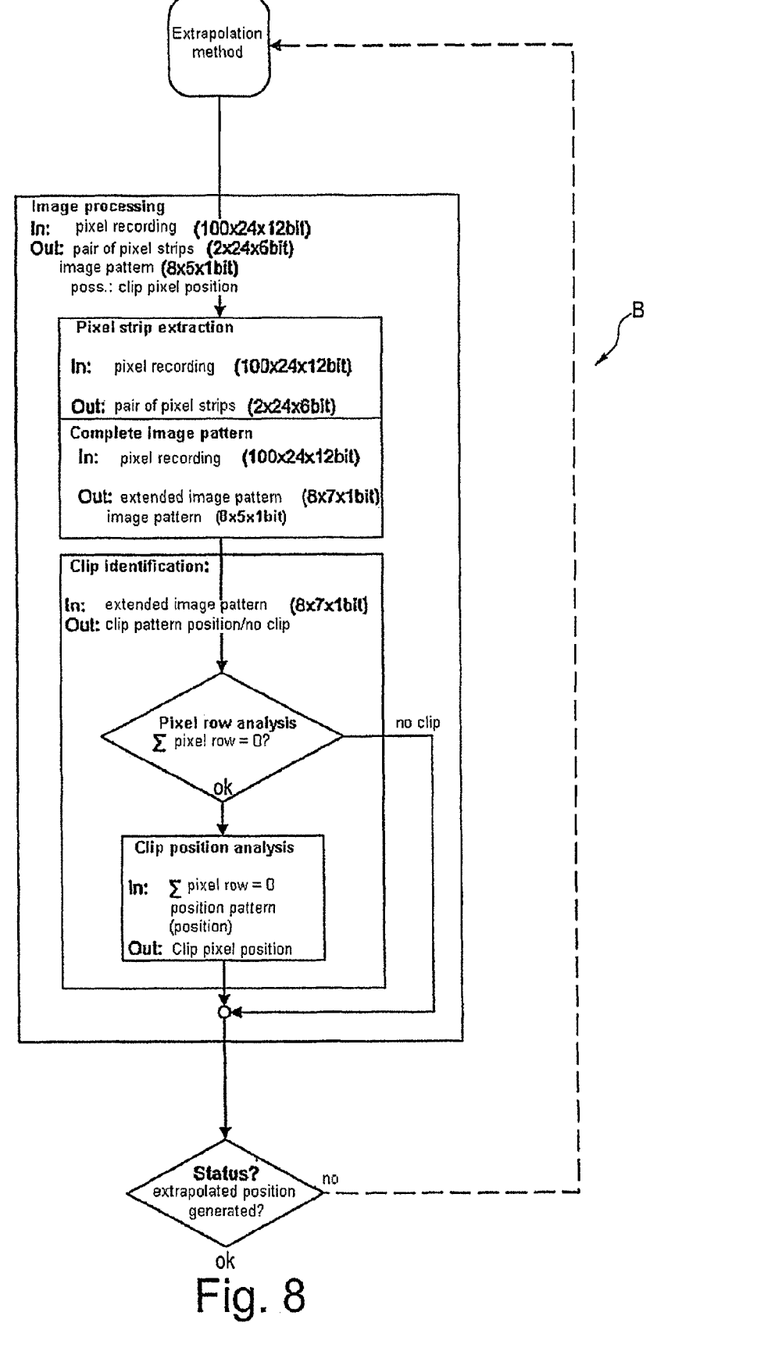
FIG. 8 shows a schematic illustration of the image processing.

Image Processing B (FIG. 8)

The next method step consists of image processing. A grayscale image has been recorded in the camera recording. It is also conceivable, in principle, to immediately record a black and white image, the more so as the code 4 imprinted on the code band 2 is designed as a barcode or 2D code, and therefore basically consists of only two colors or brightnesses. However, it must be taken into account that it is not always possible to exactly detect the same brightness values of a surface by influences from ambient light, deposits on the code band, slight differences in distance or in detection angle. Black surfaces then, as the case may be, appear more or less gray. In order to be able to take account of this effect, it is advantageous to record a grayscale image and to decide with the aid of the color, here with the aid of a threshold value of a grayscale or brightness, whether the detected surface or the detected pixel is to be assigned to a dark or a bright region with reference to a barcode or a 2D code. If appropriate, this threshold value can also be set as variable, thus likewise in principle enabling readjustment. For one thing, the recorded images can thereby be converted in principle into a 1-bit image. Secondly, it is to be borne in mind that a type of image detection or assignment to a screen is also performed in the image processing.

Figure 3:
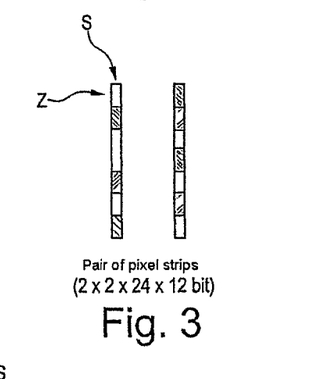
FIG. 3 shows a pair of pixel strips.

In this way, it is possible to separate (in the present case) two pixel strips which comprise 2×24 pixels and whose longitudinal extent runs along the columns S (compare FIG. 3).

Figure 4:
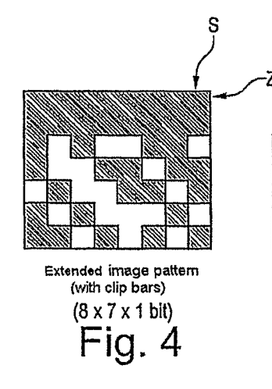
FIG. 4 shows an extended image pattern.
Figure 5:
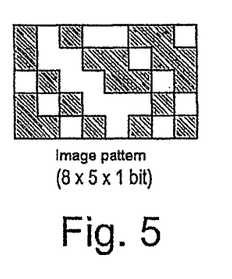
FIG. 5 shows an image pattern.

Furthermore, an image pattern and an extended image pattern are generated (FIGS. 4 and 5). The extended image pattern is illustrated in FIG. 4 and consists of 8×7 matrix elements in a black and white image, that is to say 1-bit representation. In these generated patterns, the matrix elements are represented in each case as a pixel in a fashion combined and reduced in size. The extended image pattern in accordance with FIG. 4 therefore has more rows Z than the image pattern in accordance with FIG. 5 because, as explained later, the bridge 8 of a bearing device 7 or of a clip can comprise three rows. In addition, each position marker, which has the complete information relating to a single position, comprises three rows in the present exemplary embodiment. If appropriate, additional rows may be required for individual evaluation methods.

The simple image pattern is illustrated in FIG. 5 and has only five rows, likewise illustrated in black and white, that is to say one-bit representation. The entire 2D matrix pattern comprises ten columns. The outer right and the outer left column 11 serve the purpose of separating position markers, that is to say coherent regions of the matrix which completely code a separate position, that is to say of marking where the position starts and stops. This is required so that in the event of random recording of an image it is clear where the position is marked and that parts of two different position markers are not being evaluated together, something which could result in an incorrect position indication. The rows of the matrix are arranged without spacing from one another in the present exemplary embodiment, thus enabling a higher density of the markings.

Figure 6:
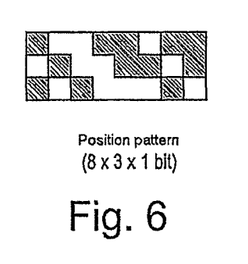
FIG. 6 shows a position pattern.

FIG. 6 shows a position pattern with only three rows, that is to say a position marker with the complete coding of a specific position.

As already described above, the code band is mounted to move in bearing devices for the movable bearing of the code band which are fastened on the wall of the lift shaft. These so-called clips 7 overlap the code band 2 toward the lift cabin (with the bridge 8), that is to say toward the side on which the marking of the code band is located. The clip, therefore, partially covers the code band in principle. At this point, the position would thus not be "detectable" in principle during a camera recording. Consequently, it is advantageous to detect the clip as such. The inventive coding device is particularly advantageous to the effect that the clip need not be detected as an image however, but that it can surprisingly be evaluated together with the code band. To this end, the bridge 8 of the clip, which projects beyond the code band and is detected, has a coding pattern which corresponds to that of the code band, that is to say a barcode or a 2D code.

It is particularly advantageous to configure the code mapped on the clip in as simple a way as possible, in particular, in a color of the barcode or 2D code coding, that is to say black or white or bright or dark. Firstly, the production of the clip is thereby simplified. Secondly, the clip can thereby be easily detected, something which is particularly advantageous because the construction phenomenon of the subsidence of buildings can entail the clip moving relative to the code band when the building subsides over time. The clip then changes its position relative to the code band upon subsidence of the building. It is therefore advantageous to provide only one of the markings with an absolute position indication, specifically either the code band or the clip, so that a comparison can be appropriately carried out. The clip can therefore be found by a mathematical analysis or the carrying out of an algorithm. This clip identification is performed in the image processing via the extended image pattern. A pixel row analysis is performed in which the cross sum over the detected matrix elements is formed. In the present case, the clip is designed as black, and so a check is made as to whether the cross sum over the matrix elements yields zero. If this is the case, it can only be a clip which is concerned, since the coding is selected such that other rows cannot have the cross sum 0.

Since it is also known how many rows the clip is using, for example, three rows, its position can also be determined. If, for example, only one row is completely black at the upper image edge, the clip is correspondingly located in the upper region of the camera recording. If all rows of the clip can be detected, it is located at a corresponding point in the camera recording K. An immediately adjacent position can therefore be assigned by a completely mapped position marker. If, in the case of an embodiment, there is no longer enough space to detect a complete position marker, it is necessary, if appropriate, to derive the position of the clip via extrapolation, or to assign the clip an appropriate position. When detecting a clip, it is not always necessary to assign its exact position; it is always sufficient to assign the clips a position in the same way, for example, with a constant offset, since it is generally necessary to establish only relative distances between the clips, in order to establish, for example, how strongly a building has subsided. By way of example, the lower edge of the clip is determined with regard to its position in the present case.

Clip Position C

In a further method step, it is established whether an extrapolated position has already been generated at all. If it is the case, it is further decided whether it was possible to identify a clip and whether a clip pixel position has been obtained. If this is likewise to be answered in the affirmative, the next partial method is that of determining C the clip position (FIG. 7). With the aid of the prior information relating to the clip position, the extrapolation method E is used to extrapolate a position of the clip. If this extrapolated position corresponds at least approximately to the clip position, the extrapolated position is output as position and, if appropriate, so also is an information item as to whether a clip was present or not. This information item can be designed as a 1-bit information item (clip bit). Finally, the clip is assigned its corresponding position (method step CP) and output. The clip position itself can likewise be stored and used later for a correction when the building has subsided.

If, by way of example, the lift has only just started and for this reason two positions have not yet been stored, the so-called analysis method A is firstly carried out.

If a position can be obtained from the detected position pattern and at least one clip bar is detected in part, the exact position of the clip bar must be extrapolated. Then, the position of the clip bar is generally slightly displaced in relation to the detected position. If the clip bar completely covers the position pattern, it may be possible to extrapolate the new position from the positions stored in the past. By way of example, if the clip bar completely fills the position pattern, it is not possible from the clip bar alone to deduce the position thereof in the present exemplary embodiment, and so the position must be extrapolated from the previously stored data.

Figure 9:
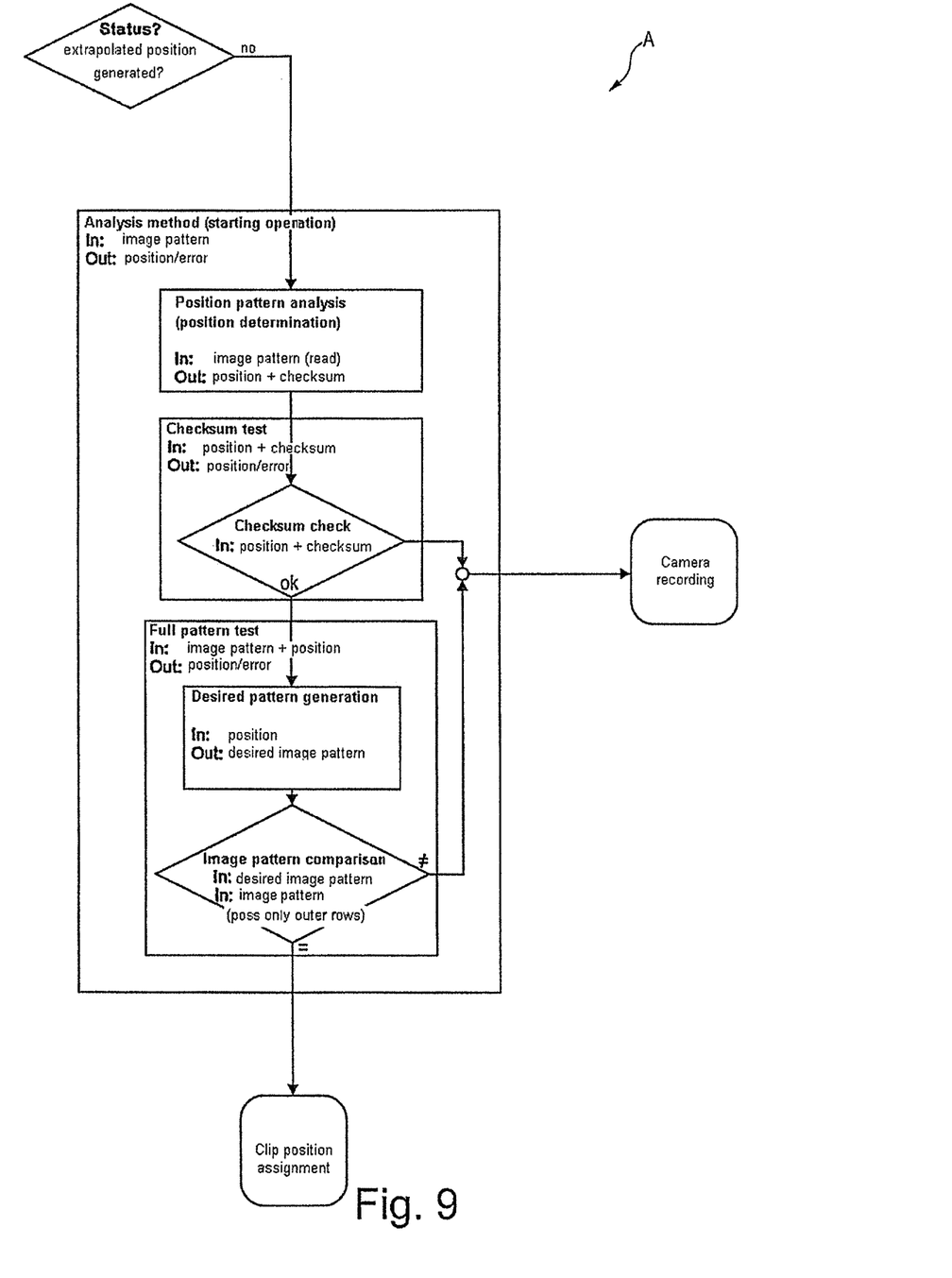
FIG. 9 shows a schematic illustration of the analysis method.

Analysis Method A (FIG. 9)

In the analysis method, the image pattern determined by the camera is firstly used to undertake a checksum test, that is to say a check is made as to whether the detected matrix elements yield a special checksum. In addition, the position marker (FIG. 6) is determined with the aid of the lateral edges 11, and the position of the recorded image is determined with the aid of the prescribed algorithm. The calculated position serves in the present case to infer with the aid of the inverse method of the algorithm which further rows border on the position marker. These have likewise also been recorded by the camera. A comparison is then undertaken as to whether these calculated patterns also correspond to that of the regions bordering on the position markers. These regions, which border on the position marker, therefore do not need to be used in addition to calculating a position. Depending on how many of the upper and lower edge regions are indicated inside the camera recording K, this is, as the case may be, not even possible straight away. If these generated codings correspond to the actually recorded codings, it may be concluded with very high probability that the position indication is actually correct. This position can then be output (position output OUT in FIG. 7), it likewise being possible, optionally, to perform an additional assignment of the clip position when a clip has been detected. If an extrapolated position has been generated, but no clip recorded, the comparison method is carried out.

As already explained above, the position pattern, which has three rows in accordance with FIG. 6, contains all of the position information. However, the analysis method uses the image pattern which comprises two rows more than the position pattern. It is therefore possible to deduce the two adjacent rows from the position pattern, to which an inverse method of the algorithm for determining the position can be applied. Thus, a corresponding image pattern to be expected is generated and compared with the actual image pattern (cf. FIG. 5). In the case of a correspondence, the established position is the actual position of the lift cabin with a high probability. As can be seen in FIG. 4, a clip bar comprises a width of three rows which, in terms of size, corresponds to a position pattern. Thus, if the clip bar appears in an image pattern, what may occur, for example, is that the latter, without the upper and lower row, forms precisely the filtered out position pattern. The clip can accordingly be identified as such by virtue of the cross sum being formed over the grayscale values in the pixel image and being compared to a grayscale value threshold value.

The clip bar is black in the exemplary embodiment. Since the value zero is assigned to the color black, this yields a cross sum of zero in the ideal case as only black pixels are detected. However, what may happen in reality is that, for example, a dark grayscale value is detected instead of an ideal black value, and so it is generally advantageous to set the threshold value not to zero but to a specific threshold value as a function of the grayscale values to be expected during the detection. If the clip is only partly in the position pattern obtained from the image pattern, a deduction about the actual position is nevertheless possible from the identified rows, taking into account the clip position. In the present exemplary embodiment, the code is selected in such a way that each row is, in fact, completely individual and does not occur a second time on the code band. If a clip bar is detected and it only makes up part of the position pattern, the uppermost or lowermost row of the image pattern must likewise automatically form part of the clip bar in the present example. This can also be taken into account in the full pattern test of the analysis method.

The high level of safety is ensured because it is not only the detection, which may, as a matter of principle, be afflicted by errors (be it by dirtying, additional reflection or other erroneous detections), that is taken into account, but also because part of the detection previously not taken into account is resorted to on the basis of inverting the algorithm and deductions in respect thereof are made.

Figure 10:
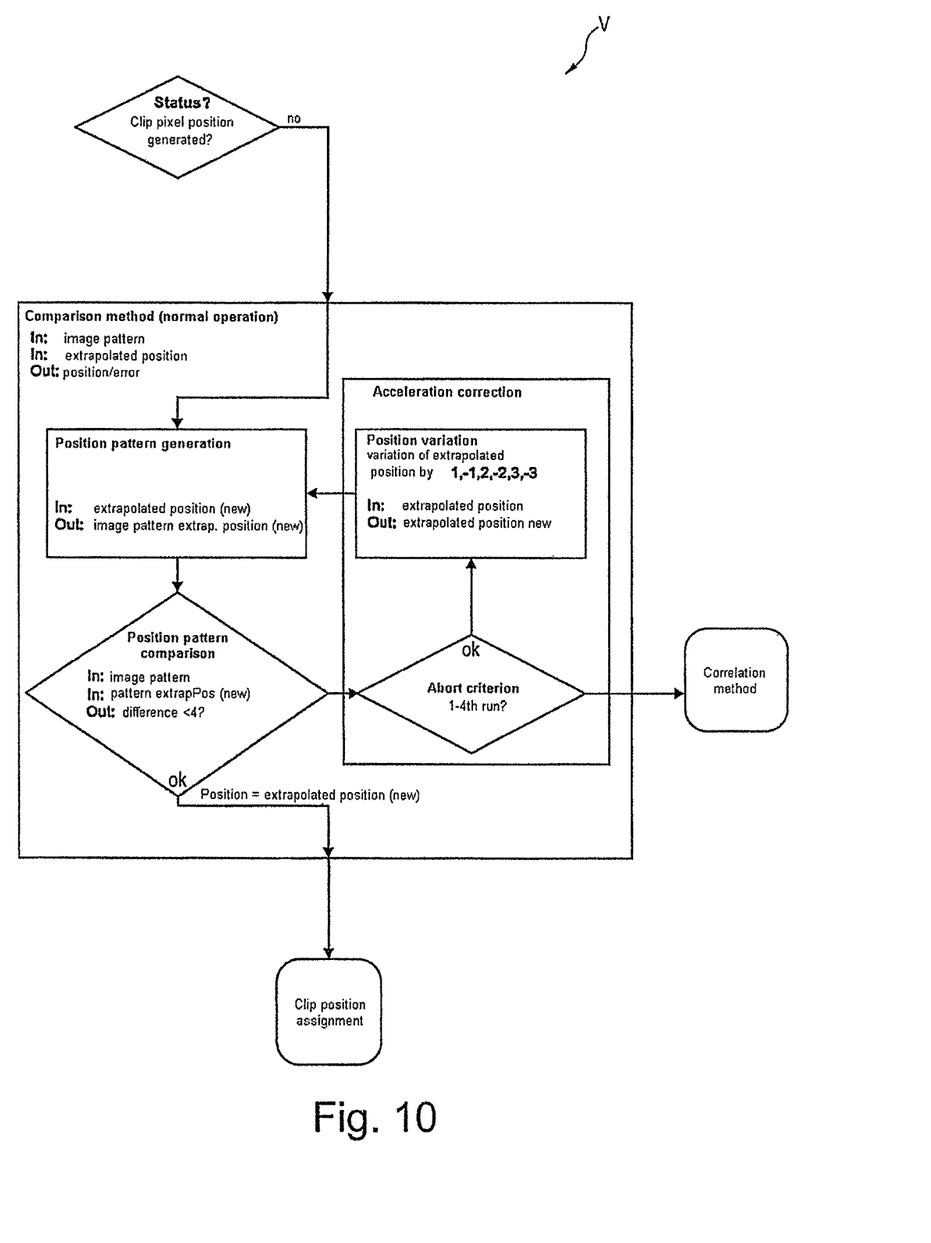
FIG. 10 shows a schematic illustration of the comparison method.

Comparison Method V (FIG. 10)

Apart from the image pattern, the extrapolated position is required for the comparison method (FIG. 7). The image pattern to be expected is determined from the extrapolated position alone and compared with that actually recorded. If the comparison is exactly correct, it can be deduced therefrom that the correct position has actually been found, and the extrapolated position is output as the position indication OUT. However, it can happen that although the extrapolated position and the actual position correspond, the recorded image can nevertheless be incorrectly processed because, for example, the code band is soiled at some points, or because other disturbing influences have played a role. If the code is selected such that only one or only a few matrix elements do not change from one row to the next, it is possible to tolerate a slight deviation in the case of a few matrix elements, and nevertheless to assume that the extrapolated position is actually present and corresponds to that recorded. In the present case, this can, for example, be assumed whenever fewer than four matrix elements deviate. It is particularly advantageous to this end to select the coding for reasons of safety such that the coding can deviate strongly from one row Z to the next. For example, the algorithm can provide a code in the case the matrix elements are interchanged in a prescribed way as a function of the position of the row, something which can easily be implemented when the algorithm is known. However, if the deviation is too large, a method can be carried out with an acceleration correction. Particularly when the lift cabin is accelerated or decelerated while it is traveling uncertainties occur with regard to the extrapolation, since these changes in speed in time would need to be detected accurately, and the speed would have to be detected by integrating the acceleration over time. For technical reasons, this cannot generally be undertaken so accurately that deviations would be inconceivable, especially as the markings, for example, are provided with a spacing of half a millimeter.

An acceleration correction is optionally carried out with a type of position variation, this would firstly likewise require the extrapolated position indication. The image pattern is now generated on the basis of the extrapolated position indication, which has been calculated, as are the further rows, which directly border on the position marker of the generated image pattern. The recorded pattern is thus compared with image patterns which are to be found one, two or three lines above the image pattern, since it corresponds to the extrapolated position indication. If the recorded image pattern exists in this region, it can be assumed that the position determination has deviated within a tolerable limit, and that the extrapolated position is the output position. If this comparison also delivers no result, a correlation method is carried out. The pair of pixel strips known from FIG. 3 is used to this end.

Figure 11:
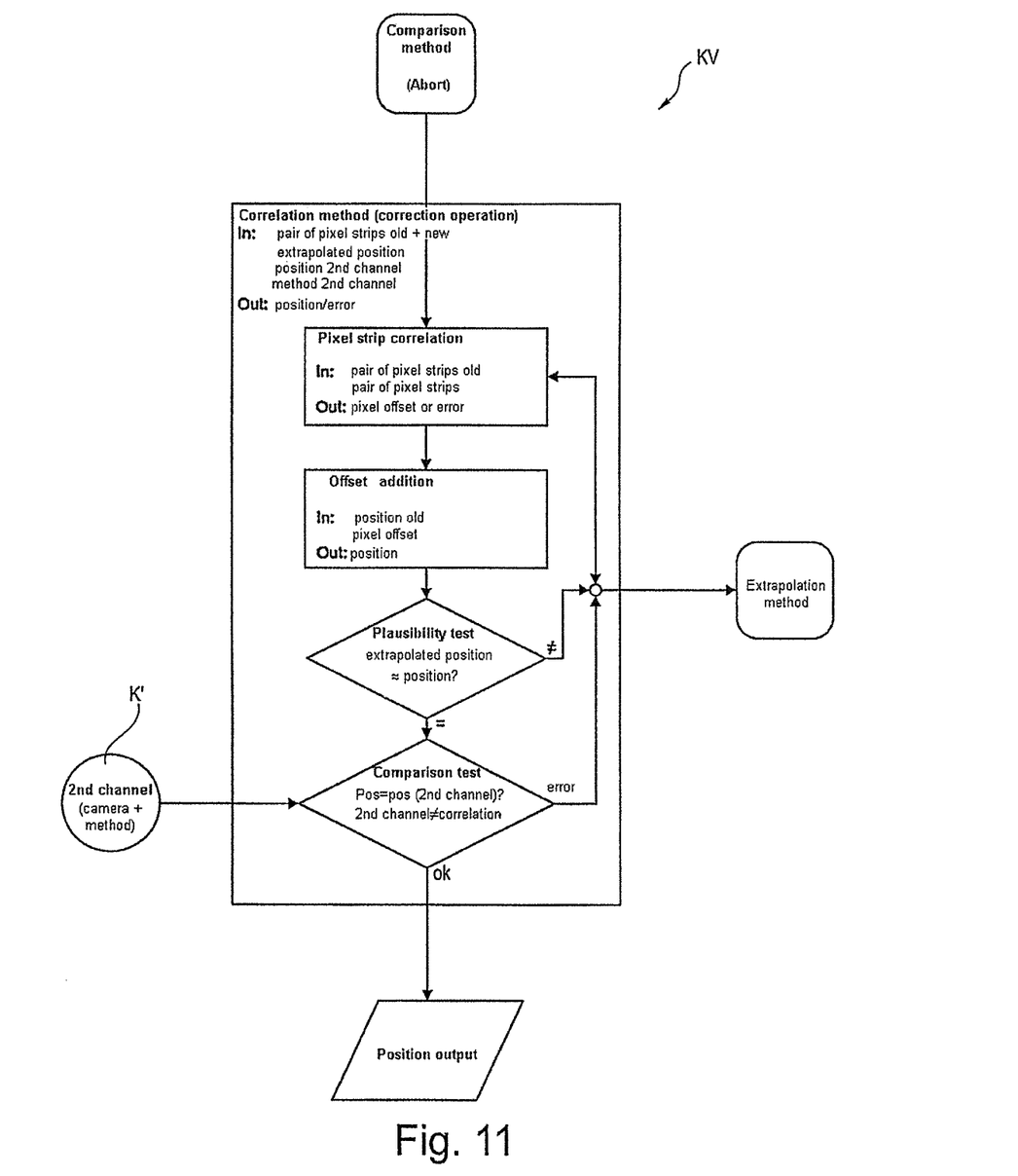
FIG. 11 shows a schematic illustration of the correlation method.

Correlation Method KV (FIG. 11)

The first requirement is the generated pair of pixel strips (see FIG. 3), specifically in each case a current pattern and a pattern previously recorded during the trip. These pixel strips, which have been recorded at different times, are, to a certain extent, laid one over another and displaced until agreement is reached. In this case, the determination is done in accordance with the offset. In addition, a plausibility check can be carried out with the aid of the extrapolated position. Since the detection device comprises two cameras overall, a second comparison can also be carried out during the correlation method KV with the aid of a second camera (second camera image K' in FIG. 7), and examined for consistency. When this correlation method KV also leads to no consistent result, a further extrapolation method E which proceeds analogously to that described above can be carried out once again. When this also leads to no result, it is necessary to carry out a new camera recording, since no position can be determined. If appropriate, a case of emergency is output when no position at all can be determined.

It is also conceivable in principle, in particular, to combine the analysis method, the comparison method or the correlation method with one another in another way, for example, in a different sequence.

LIST OF REFERENCE SYMBOLS

1 Detection device
2 Code band
3 Position strip
4 2D code
5 Matrix element
6 Matrix element
7 Clip 8 Bridge
9 Detection lighting
10 Detection lighting
11 Marking columns
A Analysis method
B Image processing
C Determination of the clip position
CP Clip position assignment
E Extrapolation method
K Camera recording
K' Second camera recording
KV Correlation method
V Comparison method
OUT Position Output

The invention claimed is:

1. A coding device for marking positions in a lift shaft and for determining the position of lift cabins in the lift shaft, comprising a code band, wherein:
   the code band has at least three markings arranged along the length of the code band in order to mark discrete positions in each case,
   the markings are embodied as a barcode and/or 2D code,
   the markings are arranged in such a way that they form rows and, in particular, there are at least as many rows as there are discrete positions to be marked,
   the markings are embodied in such a way that they comprise a position marker for each discrete position to be marked,
   the markings are decodable by means of an algorithm, wherein, in particular, there exists a mathematical function which uniquely assigns each marking of a position to the corresponding position,
   at least one bearing device is provided for bearing the code band in the lift shaft such that it can be moved, in particular be moved longitudinally, said bearing device being embodied to overlap the code band at least partly, preferably completely, and being embodied in such a way that it carries a marking, in particular a barcode and/or a 2D code, arranged in such a way that it covers at least part of the marking of the code band in a readable manner when overlapping the code band.

2. The coding device according to claim 1, wherein the markings are arranged in such a way that they form at least two columns.

3. The coding device according to claim 1, wherein the position markers are embodied in such a way that a discrete position is coded in at least two rows.

4. The coding device according to claim 1, wherein part of the marking is embodied to characterize the position markers.

5. The coding device according to claim 1, wherein the markings are applied without a spacing and/or equidistantly on the code band.

6. The coding device according to claim 1, wherein the bearing device comprises a bridge in order to overlap the code band on the side on which the markings are applied and/or which is to face a detection device.

7. The coding device according to claim 1, wherein the markings of the at least one bearing device are applied on the bridge and, in particular, only have a single-color embodiment, preferably in precisely one of the two colors of the barcode and/or 2D code, preferably corresponding to the darker code color, particularly preferably being black.

8. A computer-implemented method for determining the position of a lift cabin in a lift shaft on the basis of a coding device according to claim 1, wherein the following steps of a first partial method are carried out, by virtue of:
   a section of a code band and/or of the bearing device being recorded with an optical detection device as a pixel image consisting of pixels and the instant of the recording being measured and assigned to the pixel image, wherein the recorded section is selected to be so large that it comprises at least one more row than the position marker,
   the pixel image being processed, in particular being assigned to a detection grid, pixels of the pixel image preferably being combined with the aid of their color and/or position in order to be able to read out the barcode and/or 2D code of the marking, the position marker being identified on the basis of the part of the marking for characterizing the position marker,
   a position code being identified in the detection grid, in particular as a barcode and/or 2D code, on the basis of the position marker,
   the position code being converted to a binary code, the binary code being decoded by means of an algorithm and being converted into a position indication and/or into the information as to whether a bearing device has been detected,
   the determined position indication being stored together with the assignable instant of the recording and/or together with indications about the movement of the lift cabin, such as e.g. velocity and/or acceleration,
   wherein the first partial method is repeatable at certain, preferably equal, time intervals of a travel of the lift cabin, and
   wherein a second partial method is carried out, in which:
      a check is carried out as to whether at least two stored position indications and the instant of recording thereof are stored,
      an extrapolated position of the lift cabin is calculated from the at least two position indications, the instants of the recording thereof and the indications about the movement of the lift cabin, and
      wherein at least one checking method is carried out to check the determination of the position of the lift cabin, which checking method uses the position indication determined from the first partial method and/or the position indication calculated from the second partial method.

9. The computer-implemented method according to claim 8, wherein the inspection method provides for an analysis method A, in which:
   a checksum test of the position marker is carried out, by means of which the position marker is checked in respect of plausibility, by virtue of a checksum being formed by way of the binary code and/or the grayscale values of the position marker and being compared to a predetermined value,
   a barcode and/or 2D code is calculated from the decoded position indication on the basis of the inverse of the algorithm, said code corresponding to the at least one row which was also recorded outside of the position marker, and this calculated barcode and/or 2D code is compared in respect of correspondence with the at least one recorded row.

10. The computer-implemented method according to claim 8, wherein the checking method provides a comparison method, in which:
   a barcode and/or 2D code and/or a position marker is calculated from the extrapolated position indication on the basis of the inverse of the algorithm and compared with the position marker determined from the first partial method, wherein, in particular, the extrapolated position indication is output as position indication if the extrapolated position marker and the recorded position marker differ by at most a predetermined number of bars of the barcode and/or matrix elements of the 2D code, wherein preferably:

a sequence of at least two position markers spaced apart from the extrapolated position marker is calculated and a comparison is carried out between this calculated position marker and the detected position marker, wherein, in particular, the position corresponding to the position for which the comparison yields complete correspondence or correspondence within a predetermined criterion is output as position specification.

11. The computer-implemented method according to claim 8, wherein a sequence of at least two position markers spaced apart from the extrapolated position marker is calculated, wherein, to this end, use is made of position markers subsequently increasing in distance therefrom.

12. The computer-implemented method according to claim 8, wherein the checking method provides a correlation method, in which at least one column of matrix elements of the markings is separated from at least two pixel images recorded with a time offset from one another in each case and said columns are compared in relation to their offset and in relation to an at least partial correspondence.

13. The computer-implemented method according to claim 8, wherein if a comparison in respectively one of the following methods, namely analysis method, comparison method or correlation method, does not result in correspondence during the checking method, at least one of the other methods, namely analysis, comparison or correlation method, is carried out.

14. The computer-implemented method according to claim 8, wherein the extrapolated position indication is output if a comparison in at least one of the following methods, namely analysis method, comparison method or correlation method, has not resulted in correspondence during the checking method.

15. The computer-implemented method according to claim 8, wherein one of the bearing devices is identified as such by virtue of the converted binary code and/or the grayscale values and/or the result of a mathematical operation, in particular the formation of a sum, in particular the cross sum of the binary code or the grayscale values, being compared to a threshold.

16. The computer-implemented method according to claim 8, wherein the information that a bearing device was detected is assigned a position on the basis of the current and/or the preceding and/or the subsequent optical detection and said position is used to determine the position of the bearing device.

17. The computer-implemented method according to claim 8, wherein the optical detection of the section is carried out as a grayscale recording.

18. The computer-implemented method according to claim 8, wherein the grayscale recording is converted into a black and white image and/or a 1-bit image on the basis of a grayscale threshold value.

19. The computer-implemented method according to claim 8, wherein the optical detections are carried out repeatedly during operation at certain, in particular equal time intervals.

20. The computer-implemented method according to claim 8, wherein the position of the bearing device is stored and/or the established positions are corrected by virtue of the established positions of the bearing devices being compared at different times.

21. A position-determining device for determining the position of a lift cabin in a lift shaft, comprising: a detection device for optically reading out the markings of the code band and a computer for carrying out a computer-implemented method according to claim 8.

* * * * *